Patented June 20, 1933

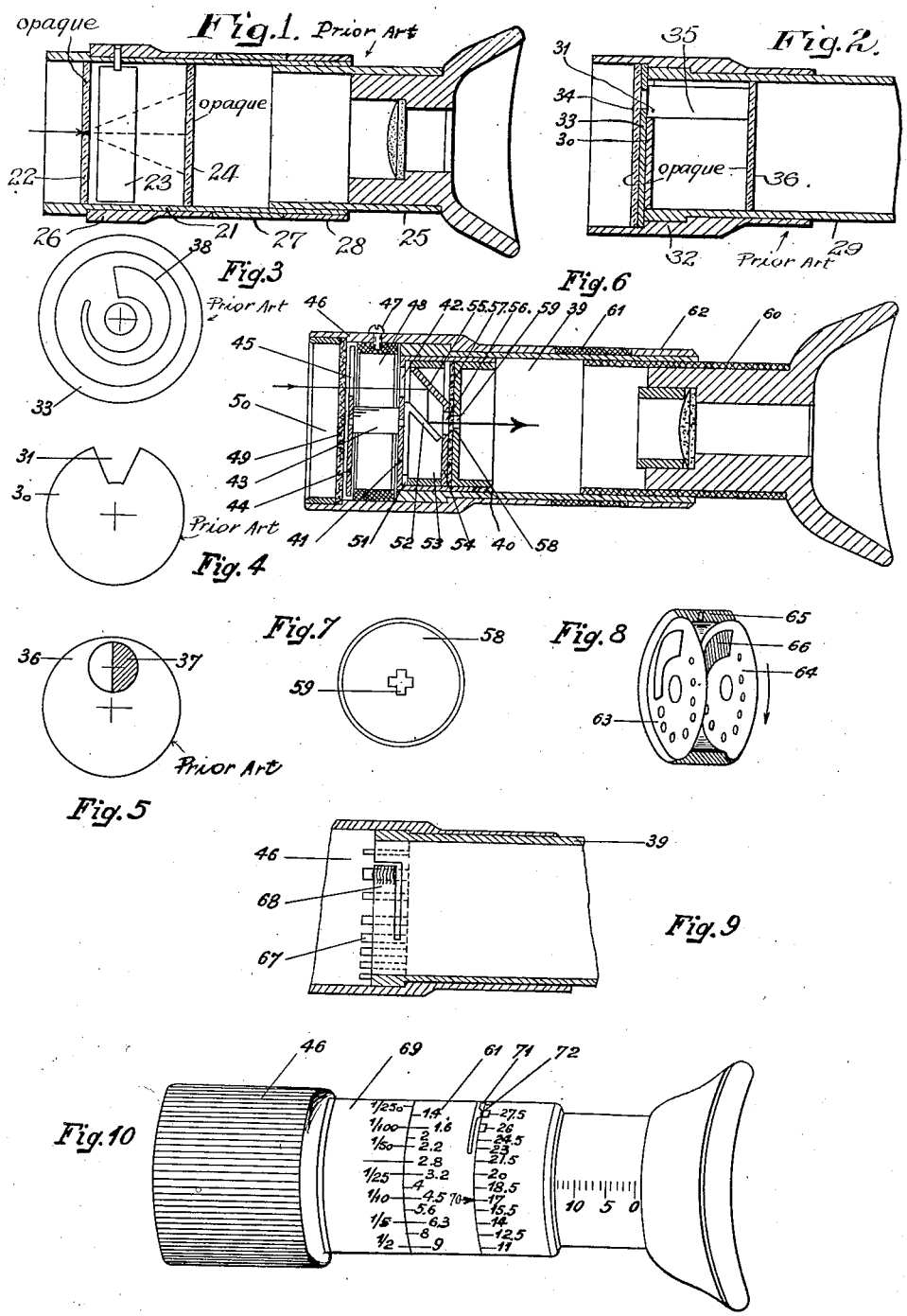

1,915,033

UNITED STATES PATENT OFFICE

WILHELM SCHLICHTER, OF FREIBURG, GERMANY

OPTICAL PHOTOMETER ESPECIALLY FOR PHOTOGRAPHIC APPLIANCES

Application filed December 17, 1931, Serial No. 581,747, and in Germany December 16, 1930.

An application has been filed in Germany December 16, 1930.

This invention relates to improvements in photometers, one object of the invention being to effect improvements in the construction of the means for damping the light, another object being to provide means for transferring the light rays from the opening in the plate in the front end of the main tube, which is eccentric, to said plate and at one edge thereof to a cross shaped opening in the center of another opaque disc, and which corresponds with the optical axis, another object being to effect improvements in the construction and arrangement of the scales for measuring the intensity of the light and determining the exposure time.

With the above and other objects in view, the invention consists in the construction, combination and arrangement of devices hereinafter described and claimed.

In the accompanying drawing

Figure 1 is a central longitudinal sectional view of a photometer illustrating the prior art.

Figure 2 is a similar view showing a detail of the construction of the same.

Figure 3 is a detail elevation of the dampening device.

Figure 4 is a similar view of the plate for arrangement in the front of the main tube and having the eccentrically arranged opening for the admission of light.

Figure 5 is a similar view of the second opaque disc having the contrasting sign.

Figure 6 is a central longitudinal sectional view of a photometer constructed and arranged in accordance with this invention.

Figure 7 is a detail elevation of the metallic disc having the cross shaped central opening forming the sign.

Figure 8 is a detail sectional perspective of the improved light damping device forming in effect a cascade diaphragm.

Figure 9 is a detail central longitudinal section of the main tube and the rotatable cap and the means for locking said members together against casual movement while the cap is being turned step by step on the main tube in the operation of the scales for determining the intensity of the light and the time required for exposure.

Figure 10 is a detail perspective view of the tubular members of the instrument and showing the scales thereon.

Photometers as heretofore constructed are provided within the main tube 21 (Fig. 1) with an opaque disc 22 which receives the incident light arriving in the direction of the arrow from the space or chamber containing the photographic object and which light enters said tube. These rays of light are transmitted through a light damping device 23 to a second opaque disc 24 provided in the interior of the instrument and on which is provided a contrast-sign which may be sighted by the ocular 25 placed in the chief tube 21. The light damping device 23 is usually combined with a revoluble exterior adjusting ring 26 placed on the main tube 21 so that the sign mounted within the path of the range of vision 24 may be darkened and brought to extinguishment by the rotation of said ring. The more luminous the light which falls on the front opaque disc 22, the greater will be the necessity to diminish the light at this end and the adjusting of the ring 26 in the point of extinguishment of the sign is exactly subordinated to the value of light which must be measured. Caculating scales, such as 27 and 28 which are rotatably or rigidly fitted on the main tube 21, have for object to enter into the calculating operation or moment other factors influencing the period of exposure such as the sensibility of the photographic plates and of the diaphragm, so that the time of exposure can be read on one of the scales. Constructional difficulties of such photometers rise in the necessity of providing a favorable light damping appliance. Owing to the concentric disposition of the whole instrument with reference to the optical axis, it seems to be obvious to utilize a light damping appliance which contracts itself concentrically to the optical axis, for instance an iris-diaphragm. However it has been found that the latter is not suitable for the purpose because it has—in view of the tube diameter of 2 cm—a too small measuring sphere, so that it has been necessary to enlarge the measuring sphere by inserting further damping means, for instance the addition of a supporting device having fields of different transparency which has again the disadvantage of a complicated operation and which endangers the exactness of the measuring result if the different measuring spheres do not constantly or continually run the one into the other. A further disadvantage incident to the use of the iris-diaphragm and other similar concentrically contracting diaphragms resides in the fact that different rotating angles are necessary to obtain the same darkening relation, that is at a greater aperture a greater angle than at a smaller, so that the adjusting scale of the ring 26 would be irregular and the arrangement of a calculating scale with equidistant divisions would be impossible.

The construction of the photometer becomes much more favorable, if there is used for light-darkening or damping a constructional organ or device of circular section whose light-damping elements are disposed on the border zone which is turned passing behind an opening provided in the border zone of a rigid plate, damping thus uniformly the light entering through the said opening in conformity with the rotating angle. Such an arrangement is shown in Fig. 2, in which only the front part of the instrument is represented. The main tube 29 is closed in front by a plate 30 having an eccentrically arranged opening 31 (Figs. 2 and 4). On the main tube 29 rotates a projecting cap 32 in which is fitted a circular plate 33 on which a circular opaque disc 34 closely bears. From the opening 31 a channel 35 is directed to the second opaque disc 36 (Figs. 2 and 5) on which is provided within the area, determined by the end of the channel 35, the contrasting sign 37, forming a circular field or point which is divided into two semi-circles of different clearness or luminosity. Within the border zone 38 of the disc 33 (Fig. 3) are provided the light-damping elements as shown in Fig. 3, comprising a spiral-like slot or a series of apertures or bores of decreasing diameter or an absorbing covering having a progressively or graduated increasing absorbtion power and the like, so that at a rotation of the cap 32 the light entering through the opening 31 is damped measurably; the sign 37 becomes thus darker and darker and finally disappears as the two semi-circles of different clearness run together.

Whatever light damping elements may be used within the border 38 of the disc 33, there exists always the great advantage that it is principally possible—when choosing the exactly appropriate light damping devices within the border zone 38—to cover the total photographic measuring sphere by only one rotation, with the help of a logarithmically equidistant division, which allows a very simple manipulation of the photometer (see also the German Patent No. 460,889).

These several advantages however are accompanied by a single disadvantage. The light damping effect within the border zone has the consequence that the radiancy is not placed on the line of the optical axis, and hence the sign 37 must be located eccentrically and on the border of the range of vision. While in all other optical instruments one is accustomed to observe the critical optical phenomenon in the center of the vision-range, that is on the optical axis, it is necessary in the optical photometer shown in Fig. 2 to direct the sight oblique-angled towards the top. This is not only inopportune but also doubtful as to the exactness of measuring. It is known that the retina has a different sensibility on the border, than in the center, so that the measuring result and the extinguishing moment are different for an eye which looks in an oblique-angled direction towards the top, than for one which looks in a straight horizontal line.

Therefore a certain dexterity and experience are necessary in order to obtain always uniform results with the help of a photometer whose contrast-sign becomes visible on the border and the inexperienced novice becomes perplexed when the sign which has disappeared when looking towards the top, reappears when he looks accidently or temporarily in the direction of the optical axis.

The object of the present invention is to provide an optical light-measuring instrument, having the special characteristics of a photometer, in which the contrasting sign is located centrally within the vision range, i. e. on the optical axis, without abandoning the most important advantages of a light-damping appliance producing its effects on the border-zone. This result is realized by the fact that the light passing through the border-sphere of the light damping device is deflected by a double reflection towards the optical axis and transferred to the central part of the vision-range on which the sign is located.

A specially practical form of embodiment of the photometer is shown in the following figures. Fig. 6 shows a longitudinal, vertical section of the instrument. The main tube 39 is closed in front by a cylindrical member 40, whose bottom 41 has an eccentrically arranged opening 42 and a riveted central stud 43 on which is fitted a circular plate 44 whose aperture 45 corresponds to the said opening 42. The cap 46 which may rotate on the main tube 39 is connected by a screw with the light-damping device 48 which can rotate within the chamber formed on the one side by the bottom 41 of the member 40 and on the other side by the plate 44, while the border sphere or zone bearing the light-damping elements passes between the two apertures or windows 42 and 45. The opaque disc 49 bears on a recess of the rotating tube 46 and is held in this position by a closing ring 50. Within the member 40 is placed, close to the bottom 41 a metal sheet 51, having a tongue 52 which is bent at an angle of 45° with respect to the optical axis. On the ring 53 which bears on the metallic sheet 51, is placed a second metallic sheet 54 having a tongue 55 which is parallel to and spaced from the said tongue 52. The said metallic sheet 54, is provided with a circular opening 56. An opaque disc 57 bears against the sheet 54, and a metallic disc 58 (Fig. 7), bears against the opaque disc 3 and has in its center an opening in the form of a cross 59, which serves as the "sign" mentioned hereabove, and which when observed through the ocular 60 movable within the main tube 39, contrasts luminously on a dark ground when the opaque disc 57 is lighted from the left hand.

The metallic faces 52 and 55 serve to deflect the light striking upon the opaque disc 49 in the direction of the arrow, after having passed through the opening 45 of the revoluble light-damping appliance 48 and through the opening 42 towards the optical axis, and to transfer this light to the centrally disposed sign 59.

As the matter in question is dispersed light, it is not necessary that the surface 52 and 53 acting as reflectors be mirrorlike. White surfaces, reflecting in a diffused manner, for instance surfaces having a lustreless, mat paint can be used. The said surfaces can also be made of aluminium rendered lustreless by brushing or corrosive agents.

61 and 62 are scale-rings taking into consideration the diaphragm and the sensibility of the photographic plate, the most advantageous inscriptions and arrangements of which are hereinafter described.

The damping device provided on the border sphere may be variously constructed. There may be used series of apertures of decreasing diameter, slots of diminishing section, angular shaped apertures covered by a grey film of continuously or graduately increasing absorbtion power, or some other damping means or combinations thereof.

Such a light damping device may be stationary or movable. It is possible to obtain only a limited light damping effect by means of a range or series of apertures of progressively decreasing diameter. If for constructional reasons the greatest aperture must not exceed a determined surface, this effect is limited by the diameter of the smallest aperture which is the last aperture of the range, and the required light damping effect can be obtained practically and with sufficient exactness. Now, if a uniformly lightened mat surface is projected on a parallel mat surface, through such a range of apertures, a graduated light damping effect is produced on this second opaque disc, and if this damped effect is again projected in a similar manner by a second range of apertures on a third mat glass, there is again produced a graduated light damping effect which corresponds to the sum of logarithmical degradations of the two different ranges of apertures and which damping effect may be accentuated by means of a third range of apertures. The light which traverses such a system is thus progressively diminished or degraduated "cascadelike".

Such a "cascade" diaphragm, comprising two graduations, is shown in Fig. 8 and consists of two congruent circular discs 63 and 64 which are connected by means of the hatched ring 65 forming thus a drum. On the disc 64 is provided a mat surface 66 shown in hatched lines. If it is supposed that such a diaphragm is inserted in lieu of that 48 shown in Fig. 6, and rotated by the rotatable cap 46 in the direction of the arrow, the light radiating from the mat glass 49 through the openings 45 and 42 is more and more damped, in proportion to the increase of the rotation angle, by means of the decreasing slot and the range of apertures (which form its continuation) provided on the two discs 63 and 64.

If for instance the surface of the passage opening, producing its effect in the initial position, is "$f$" qmm, and if a total light damping effect is required in the relation of 1600/1, this requirement is realized by the fact that the surface of the last aperture of the range is chosen $=1/40\ f$, because the lighting power of the mat surface 66 is thus reduced on 1/40 of the initial luminosity, 1/40 $f$ of this surface being only effective, so that the resulting damping effect is $=1/1600$, which it would not be possible to realize by one only range of apertures because then the smallest aperture must be 1/1600 $f$, while the production of a range of apertures, with a largest and smallest surface of respectively 4 and 0,1 qmm (corresponding to an aperture of 0,4 mm dtr.) offers no difficulty when using a perfect punching tool.

The light damping effect can be realized continuously or gradually. The continual damping could be obtained under the present circumstances at an equal measuring range or sphere, for instance by a 3-graduate "cascade" diaphragm, wherein the damping effect of each grade is effected by means of a slot becoming more and more contracted toward one end. Practice has however shown that a graduate darkening is more favorable, because the sign observed in the range of vision then becomes darker by graduation and extinguishes also in the same manner, so that the criterion of adjusting becomes also more apparent for persons not acquainted with the art. It is of no importance if there are used in this case continuously or gradually acting light damping elements on the border zone of the light darkening device, but it is important in this direction that the rotation movement of the light damping device or the rotative tube acting on it be constructed in such a way that it grasps into arresting points, so that at this grasping into the arresting points, determined light damping grades are passed which must be determined in such a way that there results therefrom a most nearly possible equidistant logarithmical scale of the exposure times.

The kind of auxiliary means producing such arresting points, is of no especial importance. A very simple, but accurate working device is shown in Fig. 9. Into the inner surface of the rotating tube 46 are cut grooves 67 into which grasps during a rotation of said tube an elastic tongue 68 which is bent outwardly from the front part of the main tube 39 and when one of the apertures of the range of the disc 63 remains in its stillstand in the center of the opening 45, the tube 46 is locked against casual rotation.

The arresting movement of the rotating tube not only has the advantage that the extinguishment of the sign discernible within the range of vision takes place suddenly, hence marking in a more precise manner the adjusting point, but its consequence is a more simple and more sure manipulation of the exterior calculating scale, as will be understood. Fig. 10 shows the exterior arrangement of the photometer. On the smooth graduated part 69 of the rotating tube 46 are directly engraved the figures and fractions and decimals indicating the exposure-times.

The ring 61 on which are engraved the diaphragm figures (1, 4—1, 6—2 . . .) and the index arrow 70, grasps with its elastic tongue 71 into the grooves 72 of the ring 62 rigidly fixed on the main tube 39 and bearing the engraved "Scheiner" scale (27, 5—26—24,5 . . . etc.). If, before measuring or determining the exposure-time, the ring 61 is placed with its index 70 on the known Scheiner graduation figure (17 for instance) the total disposition of the scale is perfectly determined and the reading off of the exposure times for the different diaphragms can be performed with great composure without fear of an involuntary displacement, because the rotating tube grasps also into an arresting groove at the moment of extinguishment of the sign (cross 59). It will be understood that it is also possible to inversely provide the diaphragm scale on the tube 46 and the exposure times on the ring 61 within the scope of the invention.

It will be understood from the foregoing that the exterior calculating disposition is constituted by three reciprocatably displaceable scales, the first whereof, rigidly fixed in the chief tube, bears the sensitivity inscriptions, the second contiguous rotatable scale ring with its index being arrestable by grasping in grooves of the sensitivity scale, while the second and third scales, indicating the exposure time and the diaphragm opening, are graved on this second ring and on the outer adjusting tube grasping in arresting grooves, acting on the light damping device, so that after having adjusted the sensitivity scale of the plates before the measuring operation, and after having obtained the adjusting point defined by the extinguishment of the sign or cross, the totality of scales of the instrument is secured against an involuntary displacement.

I claim:

An optical instrument of the class described, having a tube provided in the opposite ends with an objective and an opaque closure having an eccentrically arranged light admitting opening, a cascade diaphragm arranged for rotary movement in the tube and comprising a pair of spaced discs each provided with eccentrically arranged openings of progressively decreasing area in the direction of rotation of said diaphragm and the openings of the rearmost disc being covered with translucent material, an opaque disc spaced from the said cascade diaphragm and having a sign opening coincident with the optical axis of the instrument, and means to deflect light from the said cascade diaphragm to and through the sign opening and into the optical axis.

In testimony whereof I have hereunto set my hand this third day of December A. D. 1931.

WILHELM SCHLICHTER.